United States Patent
Compton et al.

(10) Patent No.: US 11,065,973 B2
(45) Date of Patent: Jul. 20, 2021

(54) POWER DELIVERY SYSTEM FOR MULTIPLE LOADS

(71) Applicant: GE Aviation Systems Limited, Cheltenham (GB)

(72) Inventors: Russell Mark Compton, Droitwich (GB); John Oliver Collins, Cheltenham (GB); Hao Huang, Troy, OH (US); David Killin Roberts, Pershore (GB)

(73) Assignee: GE Aviation Systems Limited, Gloucestershire (GB)

( * ) Notice: Subject to any disclaimer, the term of this patent is extended or adjusted under 35 U.S.C. 154(b) by 551 days.

(21) Appl. No.: 15/873,927

(22) Filed: Jan. 18, 2018

(65) Prior Publication Data

US 2018/0222334 A1 Aug. 9, 2018

(30) Foreign Application Priority Data

Feb. 8, 2017 (GB) ..................... 1702028

(51) Int. Cl.
*B60L 53/24* (2019.01)
*H02J 1/08* (2006.01)
*H02J 7/00* (2006.01)
*H02J 3/32* (2006.01)

(52) U.S. Cl.
CPC .............. *B60L 53/24* (2019.02); *H02J 1/08* (2013.01); *H02J 7/0063* (2013.01); *B64D 2221/00* (2013.01); *H02J 3/32* (2013.01); *H02J 7/0013* (2013.01); *H02J 7/0068* (2013.01); *H02J 2207/20* (2020.01); *Y02T 10/70* (2013.01)

(58) Field of Classification Search
CPC .................................................... B60L 53/24

USPC ............................................................ 320/137
See application file for complete search history.

(56) References Cited

U.S. PATENT DOCUMENTS

| | | | |
|---|---|---|---|
| 5,764,502 A | 6/1998 | Morgan et al. | |
| 9,013,066 B2* | 4/2015 | Kojori | H01M 10/46 307/82 |
| 2013/0038289 A1* | 2/2013 | Tse | H02M 3/1584 320/118 |
| 2013/0310994 A1 | 11/2013 | Schroeter | |
| 2015/0123463 A1 | 5/2015 | Huang et al. | |
| 2015/0123467 A1* | 5/2015 | Yasui | H02J 4/00 307/9.1 |
| 2016/0039371 A1* | 2/2016 | Blumer | B60L 50/10 290/31 |

FOREIGN PATENT DOCUMENTS

| | | |
|---|---|---|
| EP | 2 860 834 A2 | 4/2015 |
| GB | 2 449 966 A | 12/2008 |
| GB | 2 550 381 A | 11/2017 |
| WO | 2015/034547 A1 | 3/2015 |

OTHER PUBLICATIONS

Search Report issued in connection with corresponding GB Application No. 1702028.0 dated Jul. 31, 2017.

* cited by examiner

*Primary Examiner* — Edward Tso
*Assistant Examiner* — Ahmed H Omar
(74) *Attorney, Agent, or Firm* — Wood IP LLC (57) ABSTRACT

A distributed converter for delivering power to a set of loads is provided. The distributed converter includes a converter battery distribution unit that includes a converter-modular power tile, and the converter-modular power tile includes a battery pack configured to deliver power to a load of the set of loads.

20 Claims, 7 Drawing Sheets (CONVENTIONAL)

FIG. 1

(CONVENTIONAL)

POWER DELIVERY SYSTEM FOR MULTIPLE LOADS

FIELD OF INVENTION

The present disclosure relates to power delivery systems. More particularly, the present disclosure relates to power delivery systems for supporting multiple loads.

BACKGROUND OF THE INVENTION

A common strategy for improving an aircraft's flight performance and its payload capacity is to design and implement electrical power delivery architectures that reduce the weight of the aircraft's electrical power delivery system. One scheme with this potential is the so-called distributed conversion paradigm where large centralized voltage converters are replaced with a set of smaller units dispersed throughout the aircraft.

However, the distributed conversion paradigm has yet to achieve significant weight savings. This shortcoming can be attributed to the requirement to distribute battery energy to loads that may be distributed in various sections of the aircraft. Specifically, in typical distributed power conversion schemes, the large gauge wires needed to provide battery energy to loads may add significant weight to the aircraft. This increased weight occurs despite decentralizing the voltage converters. Several conventional approaches to mitigating this dilemma are used in the industry.

One conventional approach focuses on boosting the output of centralized batteries for light-weight distribution. Inverters are used to generate a 115V alternating current (AC) to feed the main AC buses for conversion back down to low-voltage direct current (LV-DC). This approach requires the main AC system to be included in the emergency distribution path, thus increasing the complexity and criticality of the AC system. This correspondingly drives costs higher. Additionally, this approach is inefficient. For example, it requires two stages of conversion (DC-AC and AC-DC), with losses at each stage. This approach is also associated with more heat being generated, which in turn, increases overall weight because more cooling equipment have to be used.

Another conventional approach uses a 270V battery, which could be used in place of the 28V battery typically used in conventional power delivery systems. A significant disadvantage of this approach is that it can necessitate the redesign of small aircraft loads that require 28V power directly from the battery. For example, the Auxiliary Power Unit (APU) start function of the aircraft's electrical power delivery system would need to be replaced with a 270V design, which would rule out the use of many existing parts.

BRIEF DESCRIPTION OF THE INVENTION

A need exists for technologies for a distributed conversion architecture that significantly reduces the weight of an aircraft's battery distribution system. Such a system would increase the viability of distributed conversion.

The embodiments disclosed herein methodologies for delivering battery power to essential aircraft loads in a distributed architecture, without the need for heavy low-voltage electrical wiring. These methodologies provide for replacement of the centralized aircraft batteries with a distributed set, thereby eliminating wiring runs from the aircraft batteries, via distribution centers, to loads.

One exemplary aspect provides a distributed converter for delivering power to a set of loads. The distributed converter includes a converter battery distribution unit that includes a converter-modular power tile, and the converter-modular power tile includes a battery pack configured to deliver power to a load of the set of loads.

Another exemplary aspect provides a distributed converter for delivering power to a set of loads in a vehicle. The distributed power converter includes a set of converter battery distribution units dispersed around the vehicle, and each converter battery distribution unit includes a converter-modular power tile that includes a battery pack configured to deliver power to a load from the set of loads.

Another exemplary aspect provides a distributed converter for delivering power to a set of loads dispersed throughout a vehicle. The distributed power converter includes at least one converter battery distribution unit in each section of the vehicle, and the at least one converter battery distribution unit includes a converter-modular power tile that includes a battery pack configured to deliver power to a load from the set of loads.

Additional features, modes of operations, advantages, and other aspects of various aspects are described below with reference to the accompanying drawings. It is noted that the present disclosure is not limited to the aspects described herein. These aspects are presented for illustrative purposes. Additional aspects, or modifications of the examples disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
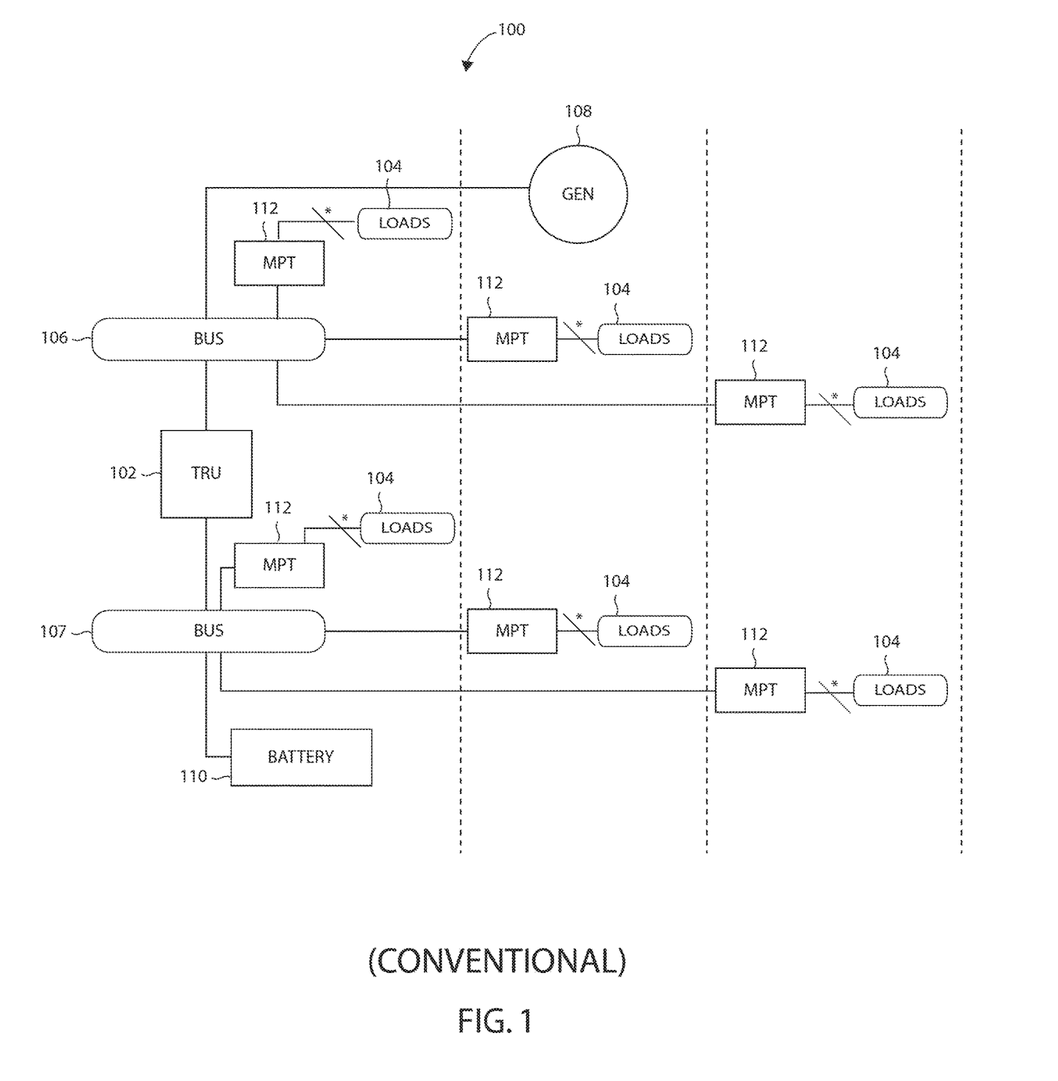
FIG. 1 illustrates a conventional power conversion architecture in accordance with several aspects described herein.

FIG. 1 illustrates a conventional power conversion architecture 100 that includes one or more transformer rectifier units (TRUs) 102, multiple loads 104, and multiple modular power tiles (MPTs) 112, each being associated with a set of loads 104. In the conventional power conversion architecture 100, the power flows from either a generator 108 to a set of loads 104 via an AC bus 106 or from a battery 110 to a set of loads 104 via a DC bus 107. The constituent components of the conventional power architecture 100 can be distributed throughout a vehicle, such as an aircraft, in various sections of the vehicle that are delimited by the dashed lines.

When the conventional power conversion architecture 100 is implemented in an aircraft, the one or more TRUs 102 are typically placed at a single location (usually in the avionics bay located in the forward part of the aircraft). However, the loads 104 can be distributed throughout the aircraft and, consequently, long wires must run between the TRUs 102 and the loads 104 in order to deliver power to the loads 104.

In the case of low-voltage loads, the wires can have a large weight, which greatly increases the contribution of the power conversion architecture 100 to the overall aircraft weight. As such, a necessary improvement of the conventional power conversion architecture 100 is to reduce its weight, which is largely due to the wiring, without compromising the ability of the TRUs 1042 to deliver the necessary power the loads 104 dispersed around the aircraft.

Figure 2:
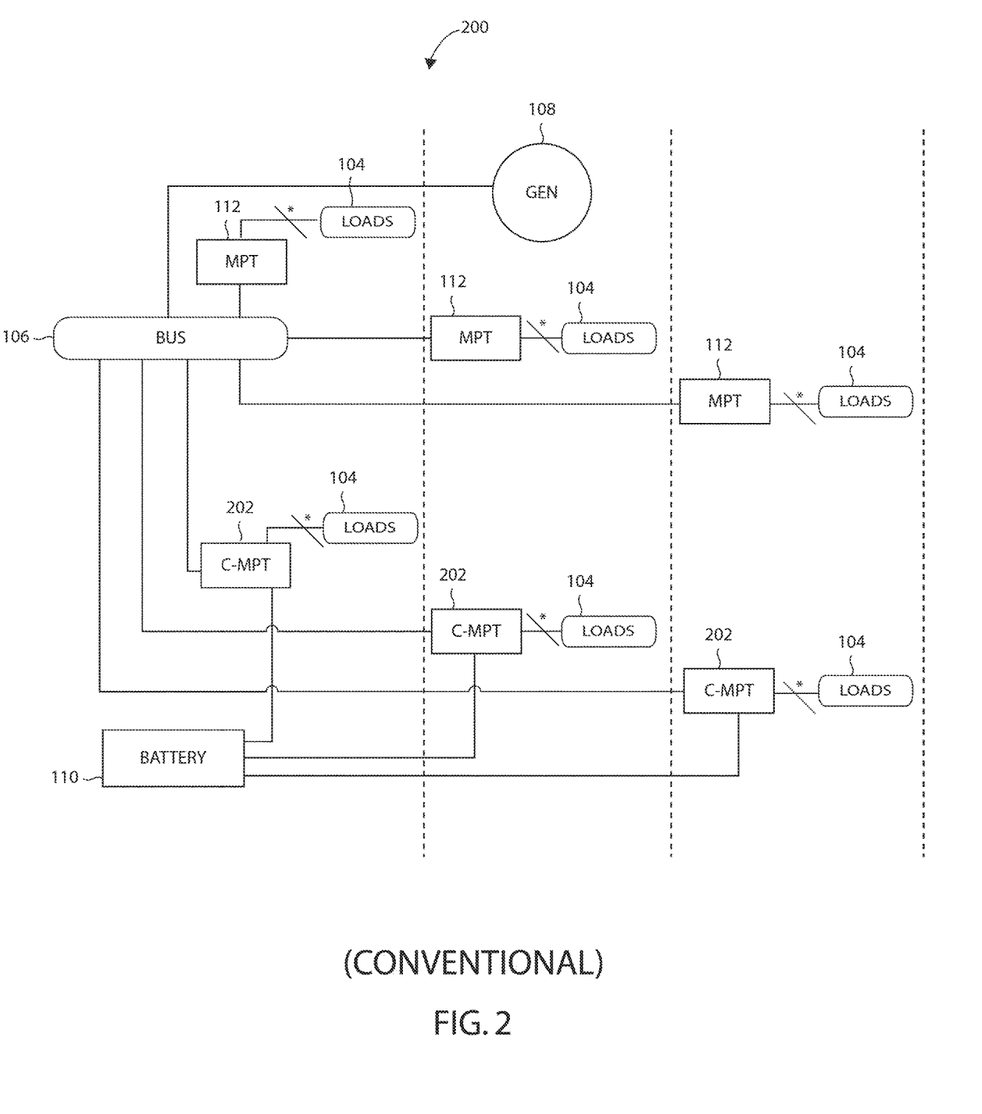
FIG. 2 illustrates a conventional distributed conversion scheme in accordance with several aspects described herein.

FIG. 2 illustrates another conventional distributed conversion scheme 200 designed to achieve the sought after weight reduction. This strategy replaces the centralized TRU(s) 102 with a set of smaller units (C-MPTs 202), each serving specific load groups. The C-MPTs 202 are placed close to their point of use. In the conventional distributed conversion scheme 200, the majority of the distribution would therefore be possible at high-voltages and with low-weight wires, theoretically allowing significant weight savings.

However, in practice, achieving these savings becomes difficult when a traditional emergency system is included in the power conversion architecture (e.g., the battery 110). Specifically, certification requirements dictate that essential aircraft loads derive power from a battery system, and when such a system is distributed at low voltages, there can be significant additional wire weight as a result of the distribution; this additional weight erodes any overall weight savings that may have been achievable via a distributed conversion architecture.

Figure 3:
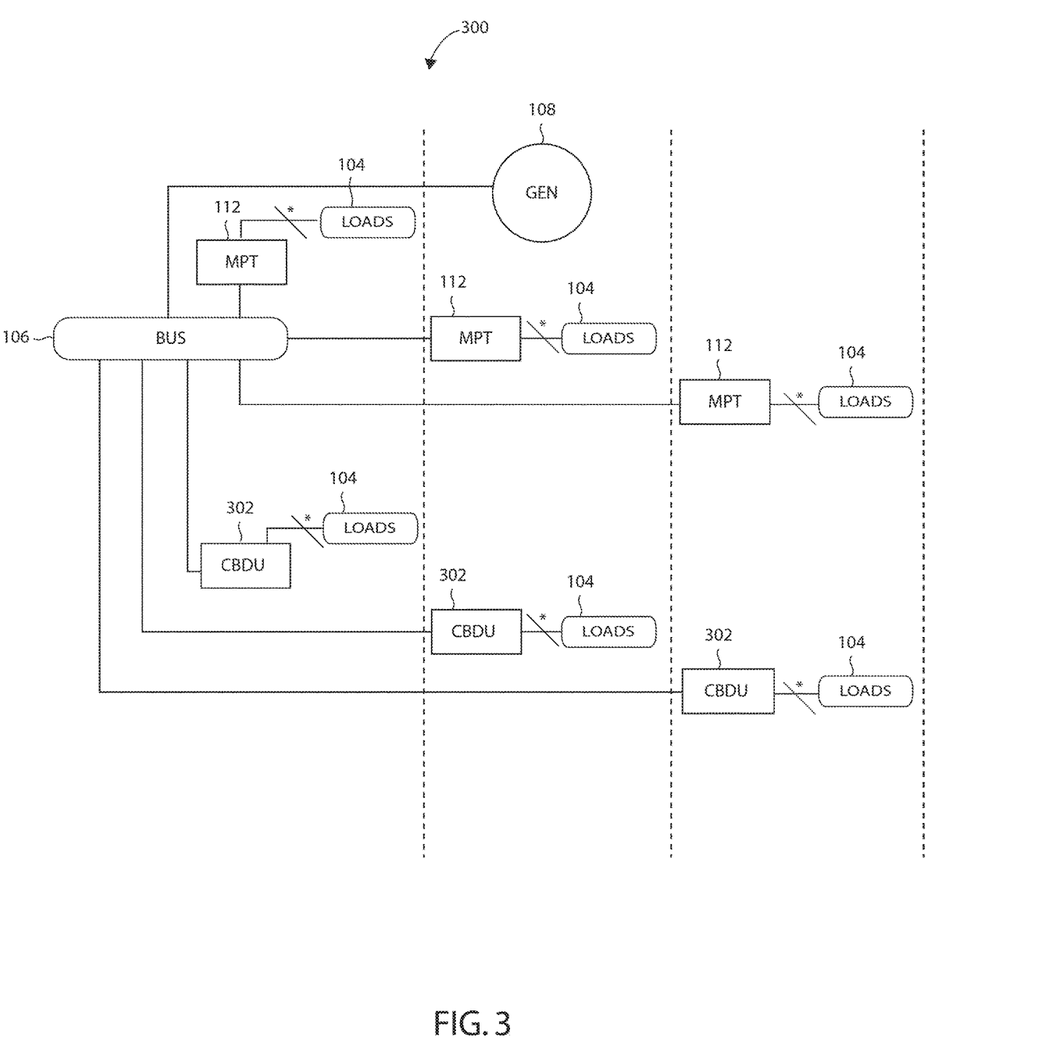
FIG. 3 illustrates a distributed battery scheme in accordance with several aspects described herein.

FIG. 3 illustrates a power conversion architecture 300 of a converter that uses a distributed battery scheme according to an embodiment. The power conversion architecture 300 helps solve the afore-mentioned issues. Specifically, the converter 300 features a distributed power conversion architecture without adding significantly more weight to the system.

The power conversion architecture 300 features a set of C-MPTs that each includes a battery pack configured to deliver power to an associated load 104; the combination of a C-MPT with a battery pack forms a CBDU 302. Generally, the battery pack can be located in the same housing as the C-MPT, or it can be located proximate to C-MPT in order to minimize the wiring necessary for interfacing the C-MPT with the battery pack. In each case, the battery pack is included in the C-MPT to form the CBDU; stated otherwise, the battery pack is co-located with the C-MPT, and together with C-MPT, it forms the CBDU.

In each CBDU 302, the battery pack is a modular battery pack, i.e., it includes a set of discrete sections, each configured to house one or more batteries. Each module of the battery pack includes one or more batteries selected to match a load 104 or a set of loads 104 connected to the CBDU 302. Each battery's energy capacity and impedance can be selected so that the battery pack can efficiently deliver power to the load 104 or to the set of loads 104. As such, the need for a global DC bus is obviated as each CBDU 302 delivers power from its battery pack directly (i.e. via its own DC bus) to its set of associated loads.

In FIG. 3, a single CBDU 302 is shown in each section of a vehicle. (The vehicle can be an aircraft, and its sections are delimited by the dashed lines.) In the exemplary arrangement of FIG. 3, only one CBDU 302 is shown per section. However, in other configurations each section can contain multiple CBDUs 302. As such, the power conversion architecture 300 is that of a distributed converter.

In some embodiments, the power conversion architecture 300 can yield a distributed converter that is configured to perform power conversion from about 115 V AC to 28 V DC. In yet other embodiments, the resulting converter can be configured to support voltages that may be unipolar or bipolar and of a wide range. For example, and not by limitation, the voltage ranges or voltages can include 270V, +/−270V, or 28V.

The power conversion architecture 300 can further include a switch configured to either isolate or connect a battery of the battery pack to the associated load 104, thus providing flexibility in pairing or isolating one or more one or more loads 104 with a particular CBDU 302. The power conversion architecture 300 can further include one or more redundant CBDUs 302 that can be used with a set of loads 104 when a particular CBDU 302 servicing these loads 104 fails. In case of failure, a redundant CBDU 302 can be connected to the loads 104 via another switched connection whereas the faulty CBDU 302 can be isolated from the loads 104 by opening a switch. The power conversion architecture 300 can further include a charging circuit or charger at each CBDU 302.

In some embodiments, each CBDU 302 can share battery energy with another CBDU 302 in order to provide additional energy at a given CBDU 302. This energy sharing capability means that each CBDU 302 can service loads 104 whose energy needs exceed that which can be provided by a single CBDU 302. Yet another advantage of the energy sharing capability is the increased redundancy in case of battery failure, as described in greater detail below with respect to FIG. 4.

Figure 4:
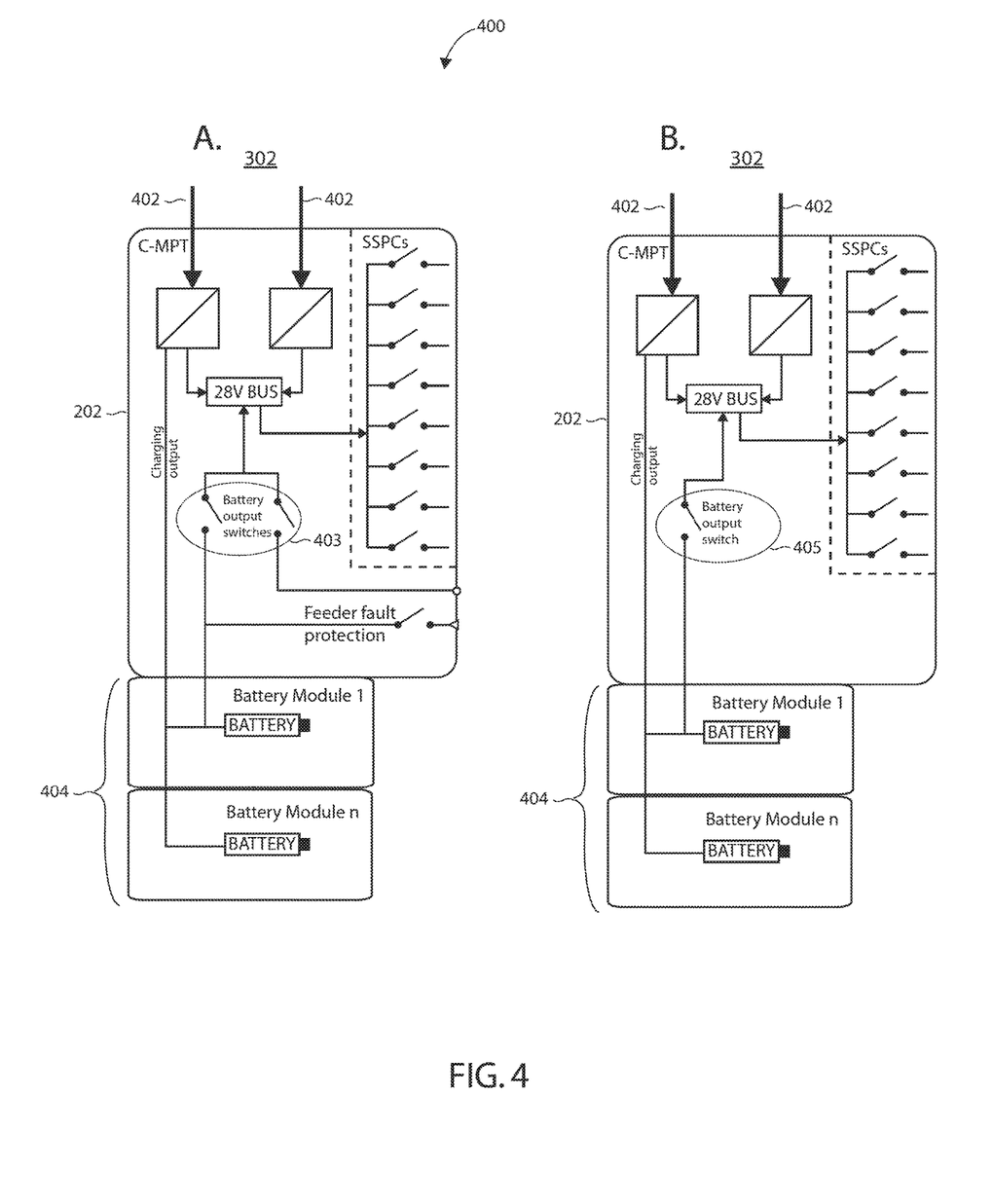
FIG. 4 illustrates a converter in accordance with several aspects described herein.

FIG. 4 illustrates part of a converter 400 that include two alternate implementations (panels A and B) of a CBDU 302 according to an embodiment. The panel A shows an embodiment of a CBDU 302 including dual inputs 402 and dual redundant battery inputs 403, whereas panel B shows an embodiment a CBDU 302 including a single battery output switch 405 with no redundancy. In each case, the CBDU 302 includes a C-MPT 302, a charger or charging circuit (see FIGS. 4 and 5), and a battery pack 404.

The battery pack 404 can include modules numbering from 1 to n, where n is an integer greater than 1. Each module can include one standardized battery, and the capacity of the battery pack 404 can be tailored by adding additional modules. The CBDUs 302 each includes one or more switches that can be controlled to either pair or isolate the CBDUs 302 with particular loads or load sets. The switches can be provided by solid state power controllers (SSPCs) or equivalent power switching technologies known in the art.

Figure 5:
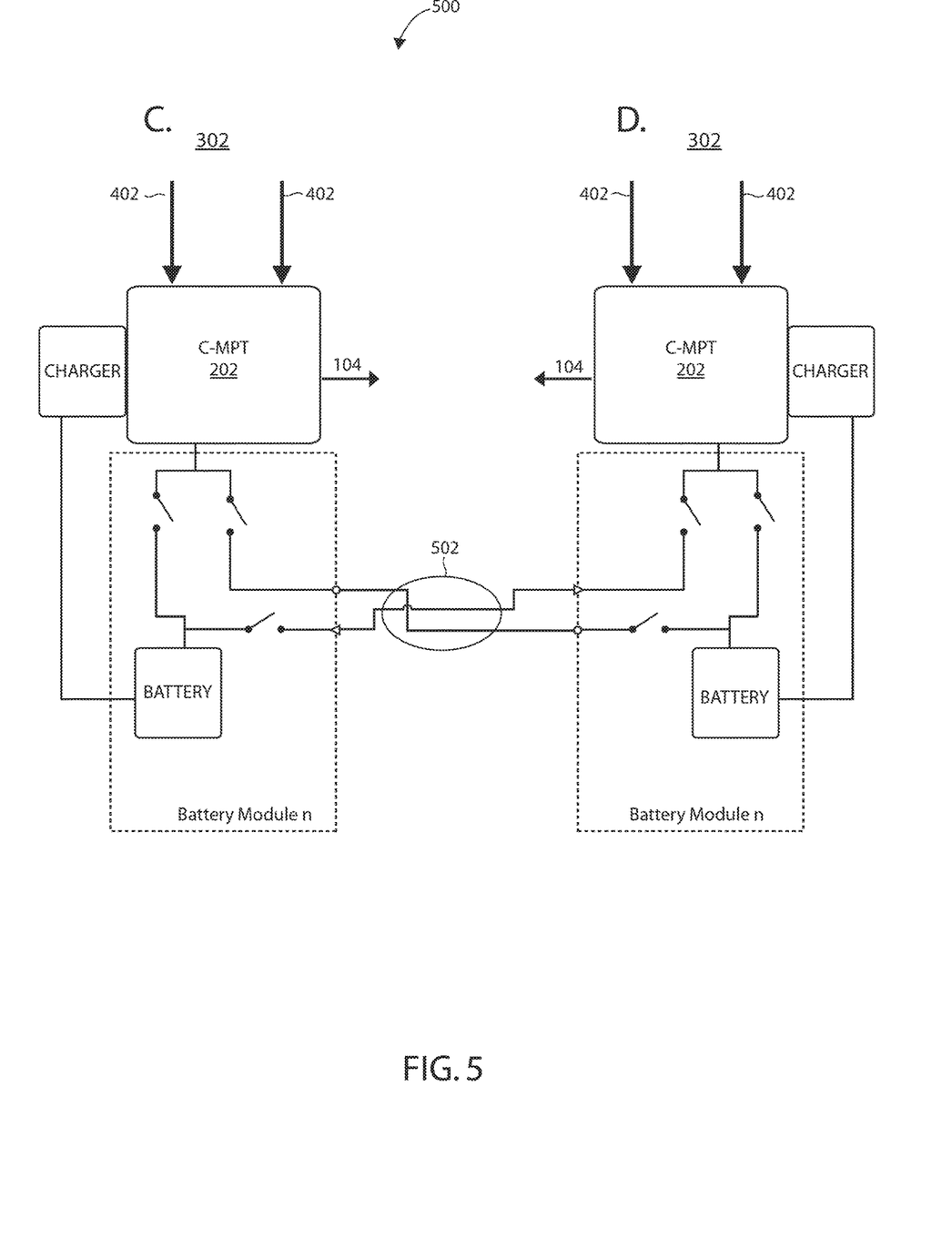
FIG. 5 illustrates a converter battery distribution unit in accordance with several aspects described herein.

FIG. 5 shows an arrangement 500 where two CBDUs 302 (panels C and D) are paired to provide energy sharing and redundancy. In the event of failure of a battery module n in the CBDU 302 of panel C, an alternative is provided to the loads of the failed CBDU 302 by a cross-tie 502 that provides the loads 104 of the failed CBDU 302 access to the battery module n of the CBDU 302 of panel D. Stated otherwise, individual CBDUs 302 may be connected together to share battery energy as shown in FIG. 5.

Figure 6:
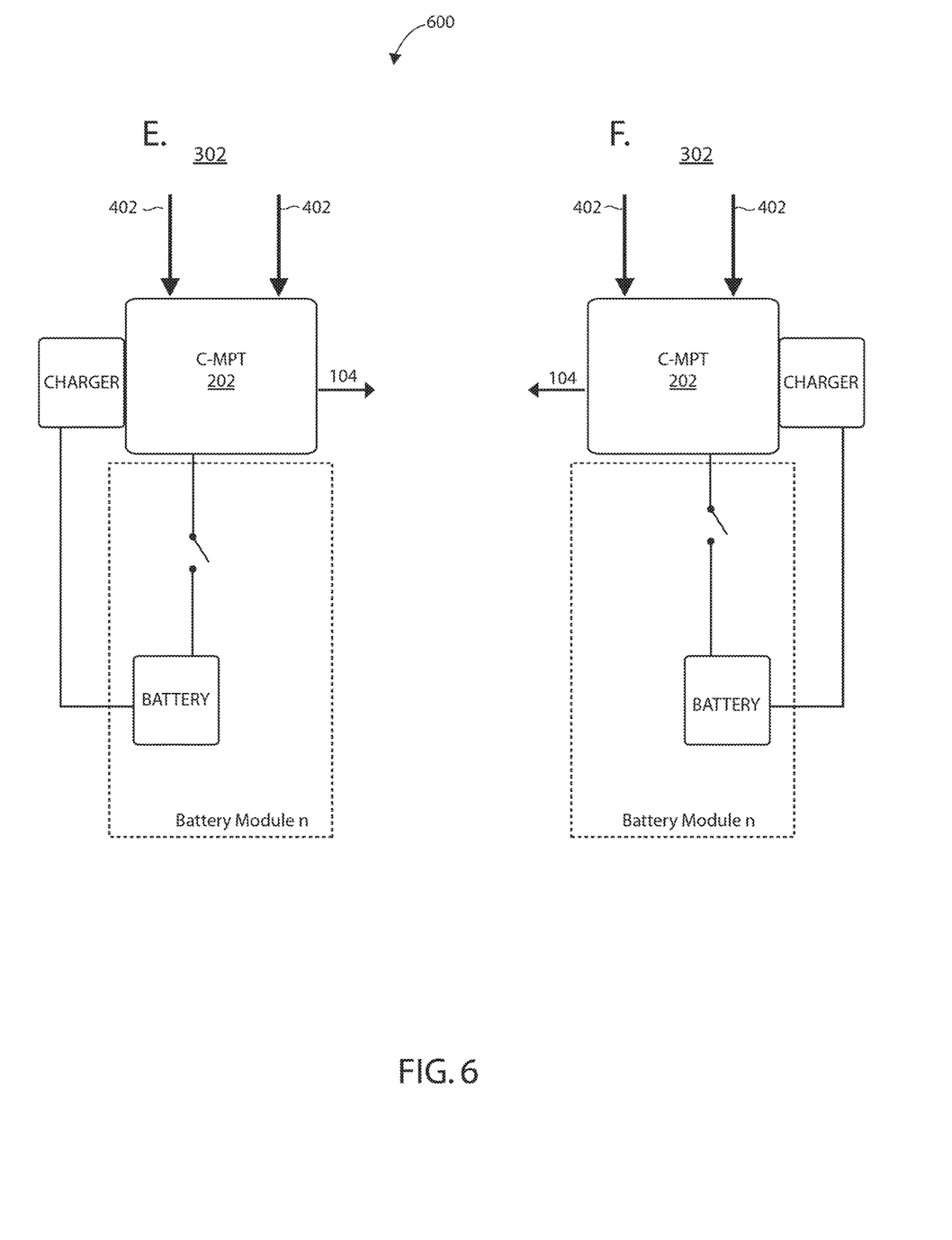
FIG. 6 illustrates a battery architecture in accordance with several aspects described herein.
Figure 7:
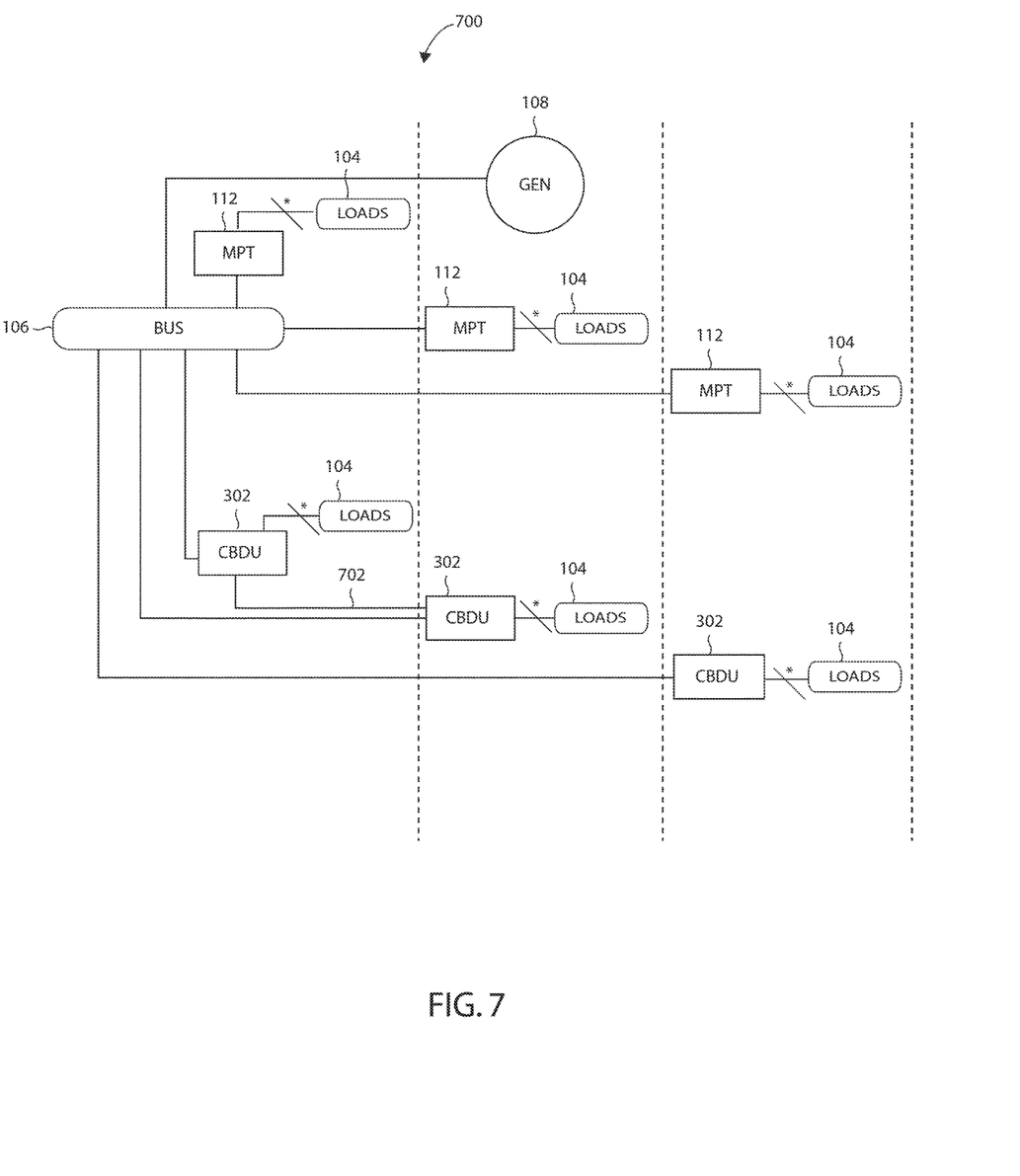
FIG. 7 illustrates a power conversion architecture in accordance with several aspects described herein.

In this approach, large wiring may be used between the two CBDUs 302. However, these wiring runs may be kept short to prevent adding additional weight. Further, it is noted that this redundancy is dependent upon the architecture, and in many applications a single battery or battery pack per CBDU 302 may be appropriate, as shown in the distributed battery scheme 600 of FIG. 6 with respect to two CBDUs 302 (panels E and F), each servicing two different sets of loads 104. Furthermore, FIG. 7 illustrates a power conversion architecture 700 in which the CBDUs 302 are connected via a DC wiring 702 in order to share battery energy. The wiring 702 can be a switched connection.

Furthermore, it is noted that in the traditional power conversion architectures 100 and 200, centralized chargers are employed. However in the CBDUs 302, the chargers are placed close to the batteries to avoid long runs of DC wiring. In some embodiments, a charger or charging circuit may be part of the CBDU 302 itself, where a dedicated charger output is provided from the converter.

Having a charger or charging circuit as part of the CBDU 302 avoids the need for a dedicated charger unit for each CBDU 302, thus minimizing weight. This implementation is also attractive for operators, as it reduces part number counts. In conclusion, the exemplary distributed conversion and battery architectures described with respect to FIGS. 3-7 may significantly reduce the weight of a vehicle's electrical system, providing increased vehicle performance and/or payload capacity.

Those skilled in the relevant art(s) will appreciate that various adaptations and modifications of the embodiments described above can be configured without departing from the scope and spirit of the disclosure. For example, whereas some of the embodiments are described in the context of aircraft systems, other vehicles in which weight distribution is of importance are contemplated. Such vehicles may be, for example and not by limitation, surface marine drones, submarine drones, or payload-carrying land robots. Therefore, it is to be understood that, within the scope of the appended claims, the disclosure may be practiced other than as specifically described herein.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A distributed converter for delivering power to a set of loads, the distributed converter comprising:

a set of converter battery distribution units, each converter battery distribution unit of the set of converter battery distribution units (i) being connected to one or more corresponding loads of a set of loads; (ii) being configured to deliver power to the one or more corresponding loads of the set of loads; and (iii) including:
a converter-modular power tile; and
a battery pack being directly connected to the converter-modular power tile and including one or more modules of batteries, each module configured to match and deliver power to a dedicated load of the one or more corresponding loads connected to the converter battery distribution unit.

2. The distributed converter of claim 1, wherein the battery pack is a modular battery pack.

3. The distributed converter of claim 1, wherein a module of the battery pack includes one or more batteries selected to match the load.

4. The distributed converter of claim 1, wherein the distributed converter is configured to perform power conversion from about 115 V AC to 28 V DC.

5. The distributed converter of claim 1, wherein the distributed converter is configured to support voltages including 270V, +/−270V, and 540 V.

6. The distributed converter of claim 1, further comprising a bus configured for power delivery from the battery pack to the load.

7. The distributed converter of claim 1, further comprising a switch configured to either isolate or connect a battery of the battery pack to the load.

8. The distributed converter of claim 1, further comprising a charging circuit configured to charge a battery included in the battery pack.

9. The distributed converter of claim 1, further comprising a redundant converter battery distribution unit configured similarly to the converter battery distribution unit.

10. The distributed converter of claim 9, wherein the redundant converter battery distribution unit is connected to the converter battery distribution unit via a switched connection.

11. A distributed converter for delivering power to a set of loads in a vehicle, the distributed power converter comprising:

a set of converter battery distribution units dispersed around the vehicle, each converter battery distribution unit of the set of converter battery distribution units (i) being connected to one or more corresponding loads of a set of loads; (ii) being configured to deliver power to the one or more corresponding loads of the set of loads; and (iii) including: a converter-modular power tile; and
a battery pack being directly connected to the converter-modular power tile and including one or more modules of batteries, each module configured to match and deliver power to a dedicated load of the one or more corresponding loads connected to the converter battery distribution unit.

12. The distributed converter of claim 11, wherein the battery pack is a modular battery pack.

13. The distributed converter of claim 11, wherein a module of the battery pack includes one or more batteries selected to match a connected load.

14. The distributed converter of claim 11, wherein the distributed converter is configured to perform power conversion from about 115 V AC to 28 V DC.

15. The distributed converter of claim 11, wherein the distributed converter is configured to support voltages including 270V, +/−270V, and 540 V.

16. The distributed converter of claim 11, further comprising a bus configured for delivery of power from a battery of the battery pack to the associated load.

17. The distributed converter of claim 11, further comprising a switch configured to either isolate or connect a battery of the battery pack to the associated load.

18. A distributed converter for delivering power to a set of loads dispersed throughout a vehicle, the distributed power converter comprising:
   at least one converter battery distribution unit in each section of the vehicle, the at least one converter battery distribution unit (i) being connected to one or more corresponding loads of a set of loads; (ii) being configured to deliver power to the one or more corresponding loads of the set of loads; and (iii) including: a converter-modular power tile; and
   a battery pack being directly connected to the converter-modular power tile and including one or more modules of batteries, each module configured to match and deliver power to a dedicated load of the one or more corresponding loads connected to the converter battery distribution unit configured to deliver power to a load from the set of loads.

19. The distributed converter of claim 18, wherein the at least one converter battery distribution unit is interfaced with a redundant converter battery distribution unit configured similarly to the at least one converter battery distribution unit.

20. The distributed converter of claim 19, wherein the at least one converter battery distribution unit is interface with the redundant converter battery distribution unit via a switched connection.

\* \* \* \* \*